United States Patent [19]
Glogowski

[11] Patent Number: 5,082,486
[45] Date of Patent: * Jan. 21, 1992

[54] PROCESS FOR PREPARING ORGANIC COMPOST FROM MUNICIPAL REFUSE

[76] Inventor: Mark E. Glogowski, 1498 Lake Rd., Hamlin, N.Y. 14464

[*] Notice: The portion of the term of this patent subsequent to Nov. 20, 2007 has been disclaimed.

[21] Appl. No.: 614,262

[22] Filed: Nov. 16, 1990

Related U.S. Application Data

[63] Continuation-in-part of Ser. No. 269,499, Nov. 10, 1988, Pat. No. 4,971,616, which is a continuation-in-part of Ser. No. 35,913, Apr. 8, 1987, abandoned.

[51] Int. Cl.$^5$ .......................... C05F 9/04; C05F 13/00
[52] U.S. Cl. ........................................... 71/9; 71/10; 71/14; 71/15; 71/22; 71/64.13; 71/701
[58] Field of Search ..................... 71/9, 10, 14, 15, 22, 71/64.13, 90

[56] References Cited

U.S. PATENT DOCUMENTS

| | | | |
|---|---|---|---|
| 4,108,625 | 8/1978 | Okada | 71/9 |
| 4,285,719 | 8/1981 | Criss | 71/14 X |
| 4,501,604 | 2/1985 | Odaira | 71/15 |
| 4,971,616 | 11/1990 | Glogowski | 71/9 |

Primary Examiner—Ferris H. Lander
Attorney, Agent, or Firm—Howard J. Greenwald

[57] ABSTRACT

A process for converting municipal garbage into organic compost material is described.

In the first step of this process, a mixture of cellulosic refuse material and earthworms is provided.

In the second step of the process, the mixture of refuse material and earthworms is maintained at a moisture content of from about 45 to about 92 weight percent and a temperature of from about 0 to about 54 degrees centigrade for from about 3 to about 8 months.

19 Claims, 1 Drawing Sheet

PROCESS FOR PREPARING ORGANIC COMPOST FROM MUNICIPAL REFUSE

CROSS-REFERENCE TO RELATED APPLICATIONS

This is a continuation-in-part of applicant's copending application U.S. Ser. No. 07/269,499, filed Nov. 10, 1988, now U.S. Pat. No. 4,971,616, 11/20/1990 which in turn was a continuation-in-part of copending application U.S. Ser. No. 07/035,913, filed Apr. 8, 1987, now abandoned.

FIELD OF THE INVENTION

A process for preparing high-quality organic compost material from municipal refuse material is described. In this process, the municipal refuse material is contacted with earthworms, earthworm castings, and moisture under controlled reaction conditions.

DESCRIPTION OF THE PRIOR ART

It is well known that organic compost material which contains a substantial amount of available water is a desirable commodity.

Processes for readily converting garbage into organic compost materials are known to those in the art, but the products they produce generally suffer from major disadvantages. Thus, for example, U.S. Pat. No. 4,108,625 discloses a process in which waste cotton is fermented for four months and then contacted with earthworms for one month; the product produced by this process only contains about 36.5 weight percent of moisture. Thus, for example, U.S. Pat. No. 4,501,604 discloses a process in which a fermented mixture of animal excrement and wood is mixed with crushed animal carcass, such mixture is allowed to ferment for two months, the fermented mixture is then mixed with earthworms, and such mixture is maintained under specified conditions for 9 months. The product obtained in this latter patent has a moisture content of 43.5 weight percent.

It is an object of this invention to provide a process for converting municipal refuse into a high-quality organic compost material.

It is another object of this invention to provide a process for converting composted material into a relatively high grade of soil conditioning material.

SUMMARY OF THE INVENTION

In accordance with this invention, there is provided a process for converting municipal garbage into organic compost material.

In the first step of this process, a mixture of shredded cellulosic refuse material and earthworms is provided A substantial portion of the shredded cellulosic refuse material is derived from paper and/or cardboard refuse.

In the second step of the process, the mixture of refuse material and earthworms is maintained at a moisture content of from about 45 to about 92 weight percent and a temperature of from about 0 to about 54 degrees centigrade for from about 4 to about 8 months.

DESCRIPTION OF THE DRAWING

The present invention will be more fully understood by reference to the following detailed description thereof, when read in conjunction with the attached drawings, wherein.

DESCRIPTION OF THE PREFERRED EMBODIMENTS

Figure 1:
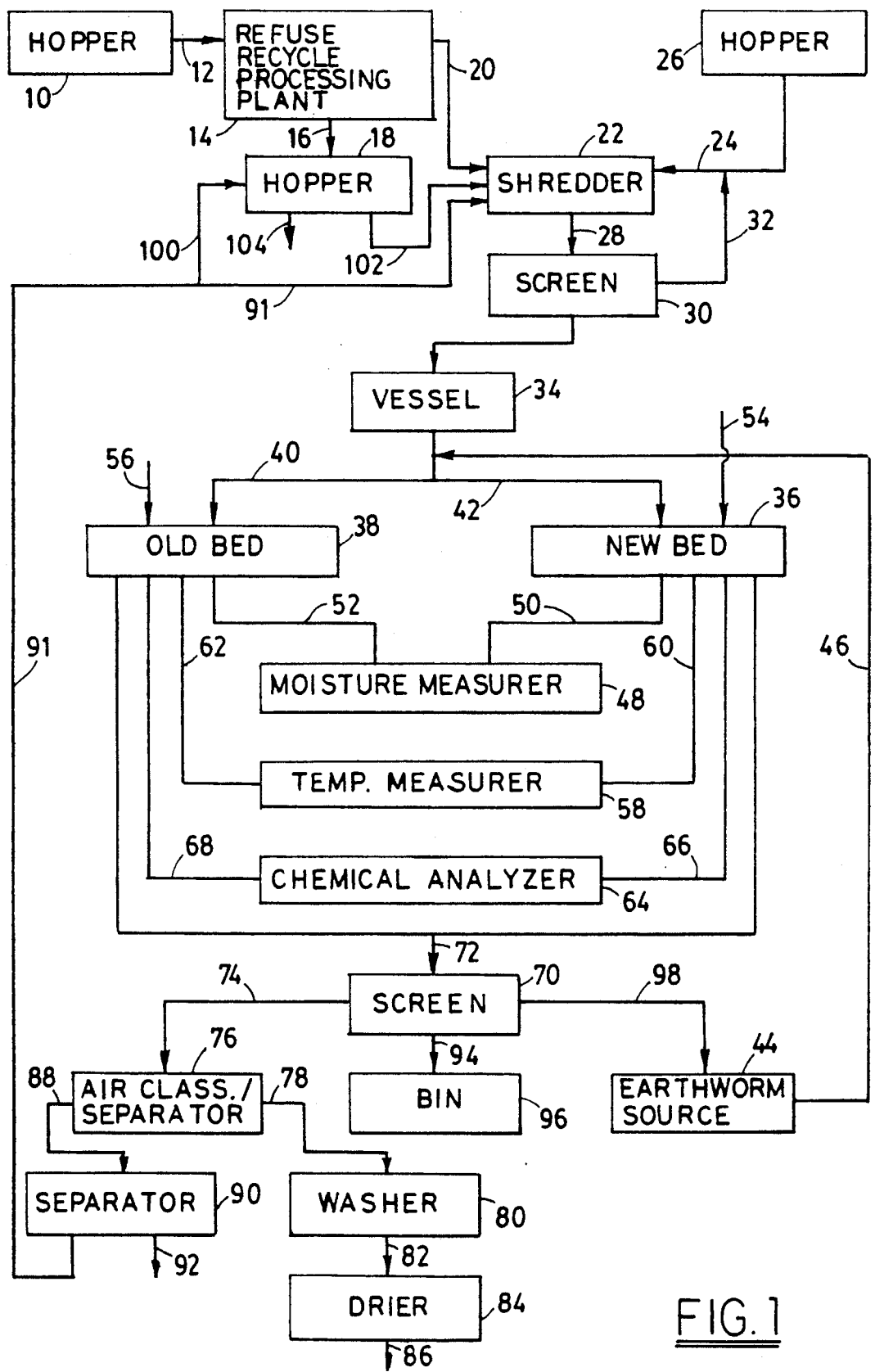
FIG. 1 is a flow sheet illustrating a preferred process of the invention.

In the preferred process of this invention, a specified mixture of worms and refuse material is provided. This preferred process of this invention is illustrated in FIG. 1, which is a flow diagram.

Referring to FIG. 1, a specified starting material is charged to hopper 10. The starting material preferably contains from about 5 to about 96 weight percent, by dry weight, of a cellulosic material selected from the group consisting of alpha-cellulose, beta-cellulose, gamma-cellulose, and mixtures thereof. The term dry weight, when referring to the starting material, refers to the composition of the material minus the moisture in it. It is preferred that from about 10 to about 70 percent, by dry weight, of the starting material be comprised of said cellulosic material. It is more preferred that the starting material comprise from about 20 to about 60 dry weight percent of said cellulosic material.

The aforementioned forms of cellulose are described in, e.g., F. D. Snell and L. S. Ettre's "Encyclopedia of Industrial Chemical Analysis", Volume 9 (Interscience, New York, 1972), A substantial amount of the cellulosic material in the starting reagent is primarily wood pulp. As is known to those skilled in the art, wood pulp is comprised of alpha-, beta-, and gamma-celluloses in the ratios from about 85.9 to about 98.2 weight percent of alpha-cellulose, from about 0.7 to about 5.9 weight percent of beta-cellulose, and from about 1.1 to about 13.3 weight percent of gamma-cellulose. In this wood pulp, the weight/weight ratio of alpha-cellulose to gamma-cellulose is from about 6.6 to about 89.09.

At least about 20 percent of the cellulosic material in the starting reagent is wood cellulose with the composition described above and with a degree of polymerization less than about 900. The degree of polymerization can be determined by means well known to those skilled in the art; see, e.g., J. P. Casey's "Pulp and Paper: Chemistry and Chemistry Technology, " Third Edition, Volume I (Wiley-Interscience, New York, 1980). Cellulosic materials with a substantially higher degree of polymerization will take too long to degrade.

In addition to containing said cellulosic material, the shredded refuse material often also contains from about 4 to 95 weight percent (on a dry basis) of a putrescible non-cellulosic material (such as, e.g. xylan, glucomannan, galactan, araban, and other saccharides and polysaccharides) or a non-putrescible, non-cellulosic material. As is known to those skilled in the art, non-putrescible material is material which will not putrefy when in the presence of moisture, earthworm castings and earthworms and/or earthworm eggs. Some suitable non-putrescible materials include glass materials, plastic materials, metallic materials, rubber, rocks, and the like.

In the process of this invention, a specified amount of earthworm material is used; the earthworm material is usually comprised of a mixture of earthworm castings and either earthworms and/or earthworm eggs. This earthworm material is mixed with or contacted with the shredded refuse. In the embodiment where the earthworm material is placed on top of the shredded reuse, the activity of the earthworm will cause a mixing of the materials so that a substantially homogeneous product will be obtained after a period of months. In another embodiment, the earthworm material is mixed with the shredded refuse.

In general, from about 20 to abut 2,000 pounds of earthworm castings and from about 1 to about 100 pounds of earthworms and/or earthworm eggs are mixed with every ton (dry weight) of shredded material. It is preferred to mix from about 40 to 1,000 pounds of earthworm castings and from about 2 to about 25 pounds of earthworms and/or their eggs with each ton (dry weight) of shredded refuse material.

In the first step of this preferred process, municipal refuse is fed into hopper 10. The preferred municipal refuse used is generally a heterogeneous mixture with greatly varying properties, sizes, and shapes. Heavy items in the waste often include glass, metals, rock, leather, rubber, and dense plastics. Light items in the waste often include yard waste, food waste, and paper.

In one embodiment, the municipal refuse is comprised of both organic and inorganic components. In general, from about 69 to about 100 percent of the refuse is often organic.

The municipal refuse usually will often comprise from about 59 to about 73 percent, by total weight of refuse, of light organic material such as, e.g., paper, plastics, textiles, and other low density materials. The refuse will also often comprise from about 3 to about 8 percent, by total weight of refuse, of heavy combustible organic material such as, e.g., corrugated paper, heavy plastics, textiles, wood, leather, rubber, and other organic matter. In addition, the refuse will often contain from about 7 to about 12 percent, by total weight of refuse, of light waste such as, e.g., small particles of food waste, animal waste and litter, and lawn waste and garden waste.

To the extent that there is inorganic material in the municipal refuse, the refuse will often comprise about 0 to about 0.4 percent of heavy ferrous metals (such as engine blocks, appliances, piping, angle irons, casting, and other massive ferrous materials), and/or from about 3 to about 8 percent of light metals (such as tin cans, nails, bottle and jar caps, and miscellaneous scrap metal), and/or from the 0.01 to about 0.1 percent of heavy non-ferrous metals (such as copper-based and zinc-based alloys), and/or from about 0.01 to about 0.4 percent of aluminum (such as, e.g., shredded aluminum can stock), and/or from about 1 to about 9 percent of glass, and/or from about 2 to about 5 percent of sand (derived from, e.g., free-flowing fine ceramics, bricks, stones, and other easily pulverized materials).

By way of illustration and not limitation, organic constituents present in municipal refuse may include carbohydrates, starches, amino acids and other simple, water soluble structures, and the more complex hemicelluloses, celluloses, proteins, fats, oils, and waxes.

From hopper 10, the municipal refuse is passed via line 12 to refuse recycle processing plant 14. These plants 14 are well known to those skilled in the art and are referred to, e.g., in an article by Glaub, Diaz, and Savage entitled "Preparing Municipal Solid Waste for Composting," Biocycle, Nov. 12, 1984, the disclosure of which is hereby incorporated by reference into this specification.

In processing plant 14, the refuse is prepossessed, i.e., the compostable fraction of the refuse is preferably segregated, size-reduced, and air-classified. In the segregation step, the heavy ferrous metal components of the refuse are removed with a magnet. In the size reduction step, the refuse from which the heavy ferrous metal components have been removed in ground and chopped to an average size of from about 0.5 to about 10 inches. In the air-classification step, heavy inorganic materials (such as rocks and glass) are separated from the refuse. As a result of these segregation, size-reduction, and air-classification steps, a product may be produced which has an average particle size of from about 0.5 to about 10 inches and is comprised of at least about 95 percent, by weight, of organic material.

The heavy ferrous metal components and the heavy inorganic materials, which are removed from the refuse in processing plant 14 are fed via line 16 to hopper 18. The remaining product, which is comprised of at least 95 weight percent of organic material, is fed via line 20 to shredder 22, in which the particle size of the material may be further reduced so that it is from about 0.5 to about 5.0 inches and, preferably, from about 0.5 to about 3.0 inches. The term "shredder," as used in refuse processing, refers to a size reduction device and includes, e.g., horizontal hammer mills, vertical hammer mills, flail mills, pulpers, and shear shredders.

In one alternative embodiment, hopper 26 is comprised of source-separated household refuse such as, e.g., cardboard, plastics, paper, food wrappers, food waste, leaves, lawn clippings, wood products, tree-trimmings, and the like. In this embodiment, such source-separated household refuse is fed via line 24 to shredder 22 where it may be mixed with organic matter from plant 14 or, alternatively, used as the sole material in shredder 22.

The shredded material from shredder 22 is then passed via line 28 to a screen to insure that substantially all material has a particle size less than 5 inches. The oversize material is recycled via line 32 to line 24 to shredder 22.

The shredded, screened material is then transported to a field and charged to vessel 34 in which it is thoroughly saturated with water. A sufficient amount of water is added to vessel 34 to saturate the shredded and screened material, and the saturated material is then placed onto a bed.

As used in this specification, the term "saturated" refers to a material which contains at least about 45 weight percent of water, by total weight; the water content can be determined by a test described elsewhere in this specification. It is preferred that the saturated material contain from about 45 to about 92 weight percent of water. In one embodiment, the water content of the material is maintained at least about 80 weight percent for the first 30 days of the process.

At this point in the process, one has the option of placing the shredded, saturated material onto a closed bed or an open bed. A closed bed is one which does not allow water to seep out of its bottom or sides. The shredded material is usually placed in a pit in the ground, a construction of loosely-fitting wooden boards, a construction of concrete blocks stacked together, or any other construction which allows a substantial amount of moisture to seep through the bottom or sides of the bed.

In one embodiment, a barrier layer comprised of impervious plastic material which prevents leachate from seeping into the water table is placed under the bed.

In one embodiment, the organic compost material produced by applicant's process with a closed bed, after it has been washed, has about 55 to about 350 parts per million of total soluble salt content and has an as-washed pH which is no greater than 0.4 pH units less than its unwashed pH. By comparison, the organic compost material produced by the open bed process, after washing, generally is comprised of from about 20 to about 150 parts per million of total soluble salt content and has an as-washed pH which, for any given starting pH, will be less than that which exists for the comparable closed bed product.

The saturated material from vessel 34 may be fed to either new bed 36 and/or to old bed 38 via lines 40 and 42.

In this embodiment, new bed 36 generally has no decomposed waste material in it prior to the addition of the saturated material from vessel 34. This saturated material is fed to new bed 36 and spread to a depth of from about 2 to about 5 feet. It is preferred that the bed be from about 3 to about 5 feet wide and any suitable length such as, e.g., from about 4 to about 500 feet. In one embodiment, the width of the bed is about 4 feet and the length of the bed is about 18 feet.

Old bed 38 generally contains decomposed waste material which usually has been derived from saturated material from vessel 34 and/or comparable saturated material from one or more other sources. In this old bed, which contains composed material and castings from earthworms, the saturated material from vessel 34 is spread to a depth of from about 0.5 inches to about 5.0 feet and, preferably, from about 2.0 to about 4.0 feet. The width of the bed is not as important as its depth, and the width may be extremely large. In one embodiment, a width of 34 feet and a depth of 3 feet are used. In another embodiment, the width of the bed is from about 3 to about 5 feet and the length of the bed is from about 4 feet to about 500 feet.

As is known to those skilled in the art, the term "castings from earthworms" refers to excreted matter from earthworms and is generally comprised of microorganisms, inorganic minerals, and organic matter in a form available to plants. These castings also contain enzymes such as proteases, amylases, lipases, cellulases, and chitinases.

Means for producing earthworm castings are well known to those skilled in the art are disclosed, e.g., in: (1) R. E. Gaddie, Sr., and D. E. Douglas' "Earthworms for Ecology and Profit," Volumes 1 and 2 (Bookworm Publishing Company, Ontario, Calif., 1977); (2) Lunt, H. A. and Jacobsen, H. G. M., "The Chemical Composition of Earthworm Casts," Soil Science 58(6): 367-375; and (3) the publications listed on pages 253-254 of Volume 2 of Gladdie and Douglas' "Earthworms for Ecology and Profit."

The earthworm castings, which generally are produced in an established bed, are transferred from earthworm source 44 via line 46 to new bed 36 and old bed 38. In general, castings are placed on top of new bed 36 to a depth of from about 1 inch to about 5 inches, and preferably to a depth of from about 2 to about 4 inches. Castings are placed on top of old bed 38 to a depth of from about 0.5 to about 5.0 inches and, preferably, from about 1 to about 2 inches. The purpose of spreading the earthworm castings on top of these beds is to prevent them from smelling.

Box 48 represents a means for monitoring the moisture in beds 36 and 38. The moisture in beds 36 and 38 should be maintained at a level sufficient so that the bed contains from about 45 to about 92 weight percent of water and, preferably, from about 50 to about 80 weight percent of water. In one preferred embodiment, during the first 30 days the mixture of castings and saturated material is in the bed, its moisture content is maintained at a level of at least about 70 weight percent of water.

The moisture content of the material in the bed may be evaluated by means well known to those skilled in the art. Thus, for example, one may use A.S.T.M. E7909-81 ("RESIDUAL MOISTURE IN A REFUSE-DERIVED FUEL ANALYSIS SAMPLE"). In this test, a sample of the material is placed in a "referee type" drying oven which is constructed so as to have a uniform temperature within the specimen chamber, have a minimum excess air volume, and be capable of constant temperature regulation at a temperature of 107 plus or minus 3 degrees centigrade; such a drying oven is described at section 6.1.1 of A.S.T.M. E790-81 and is illustrated in FIG. 1 of A.S.T.M. Method D 3173. In the procedure described in A.S.T.M. test E790-81, the sample is charged into a container, which is then covered. Thereafter, the covered container containing the sample is weighted, the cover is removed, and the uncovered sample is heated in the referee oven at a temperature of 107 plus or minus 3 degrees for one hour. The sample is then removed from the oven, covered, and cooled in a dessicator oven dessicant. The covered container is then weighed, and the percent mositure in the sample is then calculated by the formula:

$$\% M = \frac{W - D}{W} \times 100$$

wherein % M is the percent moisture in the sample, W is the weight of the undried sample, and D is the weight of the dried sample.

In the process of this invention, after the earthworm castings are added to the bed comprised of the refuse material, the mixture of castings and refuse material is maintained for a period of from about four to about eight months at a moisture content of from about 45 to about 92 percent and at a temperature of from about 0 to about 54 degrees centigrade. It is preferred to subject the material to these conditions for a period of from about five to about seven months. The time the material is subject to these conditions is critical. If the reaction time is less than four months, a relatively low yield of the product with the desired moisture content and particle size distribution will be obtained. If the mixture is maintained under the specified conditions for more than eight months, the product obtained will show a decrease in its moisture content when it is removed from the bed and subjected to ambient conditions.

In one preferred embodiment, the moisture content of the bed is maintained at from about 50 to about 80 weight percent of water while its temperature is maintained at from about 50 to about 32 degrees Fahrenheit.

Any means known to those skilled in the art for monitoring moisture may be used in applicant's process. Thus, by way of illustration and not limitation, one can use the capacitance method, the resistance method (conductance), the Karl Fischer method, the electrolysis method, the dew-point method, and the like. These methods, and the apparatuses which are utilized with them, are described on pages 22-52 to 22-56 of Robert H. Perry and Cecil H. Chilton's "Chemical Engineers' Handbook," Fifth edition (McGraw-Hill Book Company, New York, 1973). Chapter 22 of this book, which relates in general to process measurement and process control, appears at pages 22-1 to 22-148.

Lines 50 and 52 extend from beds 36 to 38 to measuring means 48. If insufficient water is present in either bed 36 and/or 38, additional water is added to one or both of these beds via lines 54 and 56.

One of the functions of the moisture in beds 36 and 38 is to maintain the temperature of these beds within a specified range. It is preferred that the temperature of the bed, at the midpoint of its width and depth, be from about 0 to about 54 degrees centigrade and, more preferably, from about 0 to about 38 degrees centigrade. In another embodiment, the temperature of the bed is maintained at from about 0 to about 21 degrees centigrade. In addition to measuring the moisture content of the material in the bed, or as an alternative thereto, one can measure the temperature of the bed at its midpoint to insure that it is within the desired range.

The temperature in each of beds 36 and 38 is monitored by temperature measuring means 58 which is connected to such beds by lines 60 and 62. Any of the temperature measuring means known to those skilled in the art can be used in this process. By way of illustration and not limitation, one can use thermocouples, resistance thermometers, liquid-in-glass thermometers, and the like.

The chemical composition of each of beds 36 and 38 may be monitored by analytical means 64, which is connected to beds 36 and 38 by line 66 and 68. Analytical means 64 measures the organic/inorganic ratio of the organic compost in the bed. Analytical means 64 also can be used to measure the carbon/nitrogen ratio of the compost in the beds.

In order to maintain the depths of beds 36 and 38 at from about 1 to about 5 feet, additional material may be added from vessel 34 to bed 36 and/or 38. Means for monitoring the depths of beds 36 and 38 (not shown) may be used in the process.

When the compost in the beds is mature, it is discharged from the beds to screen 70, via lines 72. Screen 70 is usually a 12.7 millimeter screen, although coarser screens (up to about 1.0 inches) or finer screens (down to about 6.35 millimeters) can also be used. Oversize material (which is often comprised of plastic material), any undecomposed organic or inorganic material, and the like, is passed via line 74 to air classifier/separator 76. Air classifier/separator 76 separates the oversize material into a light plastics fraction and a heavy, undecomposed organic and inorganic fraction. The light plastics fraction is passed via line 78 to washer 80, where the plastic material is subjected to a light water wash and then passed via line 82 to drier 84, wherein it is dried to a moisture content of from about 0 to about 25 percent, by weight. Thereafter, the dried plastic material is passed via line 86 to storage, for sale. The heavy undecomposed organic and/or inorganic fraction(s) are passed via line 88 to separator 90. In separator 90, the heavy fraction(s) are submerged in water. The portion of the slurry which settles consists primarily of metal and/or other inorganic materials; this portion is passed via line 92 for further processing to separate out the metals and inorganics by known techniques such as, e.g., that described in Biocycle, page 20 (4), 1983.

The undersized material which passes through screen 70 is comprised of earthworm castings and earthworms. It is preferred that screen 70 be so constructed that the earthworms are passed via line 94 to bin 96 (where they may be further processed before being marketed) and the earthworm castings are passed via line 98 into earthworm source 44.

In one alternative embodiment, the heavy organic/inorganic material from separator 88 is passed via line 91 and 100 to bin 18. In this embodiment, the materials in bin 18 are submerged in water. The materials that float or that are suspended in water are passed via line 102 to shredder 22. The materials that settle out of the slurry are fed via line 104 for further processing.

THE ORGANIC COMPOST MATERIAL OF THE INVENTION

The organic compost material produced by the process of this invention is preferably comprised of from about 45 to about 92 percent, by weight, of water. It is preferred that the compost material comprise from about 50 to about 80 weight percent of water. In one embodiment, the compost material comprises at least 70 weight percent of water.

The particle size distribution of the organic compost produced by the process of this invention is relatively fine. This is advantageous inasmuch as a relatively fine particle size distribution allows plants in said material to adsorb more nutrients, adsorb more water, and be aerated by more air.

The particle size distribution of the organic compost produced by the process of this invention can be determined by means well known to those skilled in the art. Thus, e.g., one can use the particle size measurement techniques described on pages 8-4 to 8-8 of Perry and Chilton's "Chemical Engineers' Handbook," Fifth Edition (McGraw-Hill Book Company, New York, 1973).

In general, substantially none of the particles in the organic compost material are larger than 2.0 inches. From about 0.5 to about 35 weight percent of the particles in the organic compost material have a size in the range of from about 1.0 inches to about 2.0 inches. From about 0.5 to about 35 weight percent of the particles in the organic compost have a size in the range of from about 0.25 inches to about 1.0 inches. At least about 50 weight percent of the particles in the organic compost material have a particle size less than about 0.25 inches. It is preferred that at least about 60 weight percent of the particles in the compost material have a particle size less than about 0.25 inches.

In one preference embodiment, the organic compost material has a particle size distribution such that at least 70 percent, by weight, of its particles are smaller than about 0.25 inches. It is more preferred to have at least 80 weight percent of the compost particles be smaller than about 0.25 inches, and it is even more preferred to have at least about 90 weight percent of the compost particles be smaller than about 0.25 percent.

The organic compost material produced by the process of this invention possesses a pH which is suitable for most agricultural uses. The pH of the compost material produced by the process of this invention is from about 6.2 to about 8.0 and, preferably, from about 7.0 to about 7.9. pH may be determined by conventional means. Thus, e.g., 100 grams of the organic compost material may be mixed with sufficient water to make up 1,000 milliliters, and the pH of the mixture may then by determined by conventional means.

In one embodiment, the ratio of organic matter/inorganic matter is the organic compost material is from about 0.6 to about 1.0. In another embodiment, said ratio is from about 0.7 to about 0.9.

THE PLASTIC COMPONENT OF THE PRODUCT OF THE INVENTION

The process of this invention may be utilized to produce several useful products, one of which may be a "plastic component" which contains little or no ash, relatively little water, and a relatively high heat content.

The plastic component which can be produced by the process of this invention contains little or no ash content. As used in this specification, the term "ash content" refers to the percentage of incombustible material in the fuel; it is that portion of a laboratory sample remaining, after heating under standard conditions to constant weight until all the combustible material has been burned away. Means for determining the ash content of a fuel are well known to those skilled in the art. Reference may be had, e.g., to A. Nelson's "A Dictionary of Mining," (Philosophical Library, New York, N.Y., 1965). Reference also may be had to A.S.T.M. Test D-3174-82, "Test Method for Ash in the Analysis Sample of Coal and Coke.

The plastic component which can be produced by the process of this invention usually will contain from about 0 to about 17 percent, by weight, of ash. In one embodiment, the plastic component contains from about 9 to about 17 percent of ash. In another embodiment, the plastic component contain from about 12 to about 15 percent of ash.

The plastic component, in addition to containing little or no ash, also contains relatively little water. Means for determining the amount of water in such a component are well known to those skilled in the art. Reference may be had, e.g., to A.S.T.M. Test D-3178-851, "Test Method for Moisture in the Analysis Sample of Coal and Coke.

The plastic component is usually comprised of from about 0 to about 25 percent, by weight, of water, and, preferably, from about 0 to about 22 weight percent of water. It is most preferred to have from about 0 to about 20 weight percent of water in the plastic component.

The plastic component generally has a relatively high heat value. The heat value of the plastic material may be determined by, e.g., A.S.T.M. Test D-3286-85, "Test Method for Gross Caloric Value of Coal and Coke by the Isothermal Bomb Calorimeter." Said plastic material usually has a heat value of from about 4,800 to about 20,000 British Thermal Units (b.t.u.'s) per pound. In one embodiment, the heat content of the plastic material is from about 5,700 to about 12,000 b.t.u.'s per pound. In another embodiment, the heat content of said material is from about 6,800 to about 8,000 b.t.u.'s per pound.

One of the unique features of the process of this invention is that it is capable of producing a plastic product with a high "combustible quotient." The term "combustible quotient", as used in this specification, refers to the ratio of the caloric content of the plastic component divided by the sum of the ash content and the water content of the plastic material. To determine this quotient, one first determines the ash content, the water content, and the heat value of said plastic component by A.S.T.M. Tests D-3174-82, D-3173-85, and D-3286-85, respectively. Thereafter, one adds the ash content and the water content to obtain the total percent of incombustible material in the plastic. This total percent of incombustible material is then divided into the heat content of the plastic material to give one the combustible quotient (in b.t.u's/pound-percent).

In general, the combustible quotient of said plastic component is from about 100 to about 2,000. In one embodiment, said quotient of the plastic material is from about 200 to about 700.

The term "plastic component" (or "plastic material"), as used in this specification refers to a synthetic organic polymeric material. The term "organic," as used in this case, refers to a carbon-containing material. The term "polymeric material" refers to any substance composed of very large molecules which consist essentially of recurring, long-chain structural units. By way of illustration, some plastic materials include poly (ethylene terephthalate); linear polyamides such as, e.g., nylon; polyacrylamides; sarans; polyethylenes; polypropylenes; polyacrylonitriles; and the like. Polymeric materials are described in B. Golding's "Polymers and Resins" (D. Van Nostrand Company, Inc., Princeton, N.J., 1959).

In one embodiment, the process of this invention is capable of producing a unique mixture of plastic material and organic compost which is usually comprised of from about 0.1 to about 50 percent of plastic material and from about 50 to about 99 percent of organic compost, by combined weight of plastic material and organic compost. It is preferred that this mixture be comprised of from about 1 to about 20 weight percent of plastic material and from about 80 to about 99 weight percent of organic compost. In determining the relative percentage of organic and plastic material, one follows a process in which the moisture content of the mixture is adjusted to 50 weight percent; the plastic material is then separated from the organic compost; the amounts of plastic material and organic compost are then determined; and the percentages of each material in the mixture, by weight of the total of plastics and organic compost material, and then calculated.

PROCESS FOR IMPROVING COMPOSTED MATERIAL

In one embodiment of this invention, a process is provided for improving the soil conditioning properties of composted material which may be produced by other processes. Thus, by way of illustration and not limitation, the compostable material which may be used as the starting material in this process may be provided by the processes described, e.g., in U.S. Pat. Nos. 4,108,625 and 4,501,604, the disclosures of which are hereby incorporated by reference into this specification.

In general, the compostable material used in this embodiment of the invention contains from about 10 to about 40 weight percent of moisture. It preferably has a particle size such that substantially all of its particles are smaller than about 2.0 inches.

The compostable material used in this process generally contains from about 1 to about 50 weight percent of the cellulosic material described elsewhere in this specification.

The compostable material used in this process is first saturated with water. Thereafter, it is mixed with a mixture of earthworm castings and a material selected from the group consisting of earthworms, earthworm eggs, and mixtures thereof.

It is preferred that the mixture contain fresh earthworm castings and earthworm eggs and/or earthworms. As will be apparent to those skilled in the art, the fresh castings contain microorganisms adapted to change the chemical properties of the compostable material.

The saturated composted material is mixed with the earthworm material to form a compostable mass which contains from about 20 to about 2,000 pounds of earthworm castings and from about 1 to about 100 pounds of earthworm material (selected from the group consisting of earthworms, earthworm eggs, and mixtures thereof) for each ton of saturated composted material.

For at least about the first thirty days after the compostable mass has been formed, the water content in said mass is maintained at a concentration of at least about 80 percent by adding water to the mass, if necessary.

The compostable mass is subjected to a temperature of from about 0 to about 54 degrees centigrade while maintaining the water content in said mass at a concentration of about from about 45 to about 92 weight percent for from about 3 to about 6 months.

The process of this embodiment unexpectedly produces a increase in the moisture content of the composted material. Furthermore, it also changes the particle size of the material such that the composted material produced by the process has at least about 90 weight percent of its particles smaller than about 0.25 inches. This decrease in the average particle size of the material facilitates the separation of any plastic which might be present in the starting material. Furthermore, it also makes the separation of any inorganic material which is initially present easier.

Without wishing to be bound to any theory, applicant believes that both of the processes described in this specification increase the metal complexing ability of the material treated.

The following examples are presented to illustrate the claimed invention but are not to be deemed limitative thereof. Unless otherwise specified, all parts are by weight and all temperatures are in degrees centigrade.

EXAMPLE 1

A new worm bed was prepared in a pit 1.0 foot deep, 8.0 feet long, and 3.0 feet wide. Wooden sides were erected around the bed, and they extended the height of the bed 2.0 feet about the ground.

A 96 cubic foot sample of air classified organic refuse ("Refuse Derived Fuel", also known as "RDF") was obtained from the Monroe County Refuse Recycle Center in Rochester, N.Y. This sample comprised shredded paper, cardboard, plastics, and cloth; it did not appear to contain metal or glass. A 1.0 pound sample of this material was placed on a 2.0 inch screen. Gentle agitation caused the material to fall freely through the screen. Two other such samples were chosen at random and sifted. This evaluation indicated that the refuse material had been satisfactorily shredded by the Recycle Center.

The material was then saturated with water. A 10 pound sample of the dry refuse material soaked up 80 pounds of water. Samples of the wetted refuse material were squeezed by hand. It was found that, with the samples, 60 to 80 percent of the water could be squeezed by hand out of the material.

The wetted refuse material was placed in the bed, filling the bed to about 0.5 feet from the top (a volume of 60 cubic feet).

Castings were removed from a previously established bed which contained several varieties of earthworms: *Eisenia foetida*, from the class Annelepigeo; *Allobophora calliginosa* and *L. rubellus*, from the class Annelendogeno; and *L. terrestris*, from the class Anneldiageo. These classes of earthworms are defined in "Advances in Ecological Research", Vol. 15, page 379 (1986).

A covering of 3 inches of castings from the previously established bed was spread onto the surface of the new bed. The castings contained about 3 ounces per cubic foot of castings of mixed, young, small earthworms (approximately 400 earthworms per ounce). There were also about 200 earthworm eggs per cubic foot of castings. An additional 6 pound of mature *Eisenia foetida* and *L. rubellus* worms were added to the bed. The covering of casting successfully eliminated orders arising from the bed.

After two months, the bed was permeated with small earthworms, averaging about 0.5 inches in length and weighing about 200 worms per ounce. The mature earthworms which had been added at the start of the experiment were evenly distributed throughout the bed. Visual examination indicated that some decomposition had occurred, but not to any great extent.

After six months, the material appeared to be completely composted. A sample was sifted through a ½ inch screen. The material which passed through the screen comprised compost and earthworms. There were some pieces of wood present, but not any sign of paper, cardboard, or food substances.

The daily morning misting was terminated, and the bed was covered to protect it from rain and to dry it.

The dried bed material was removed from the bed and placed on a ½ inch screen. With gentle agitation, the castings rapidly passed through the screen. The earthworms were separated from the bed material; depending on the motion of the screen, the earthworms were either allowed to pass through the screen or were carried to the edge of the screen and then dumped into a bin. The plastics present in the material were now easily separated and remained on top of the screen. The larger worms, which were allowed to pass through the ½ inch screen, were separated using a ¼ inch screen. The worms which separated with the plastics quickly crawled down, away from the sunlight. An alternative method of collecting the earthworms, which proved to be nearly as effective, was to spread the castings onto a board in bright sunlight and to slowly remove the top one to two inches of castings every 15 minutes. The earthworms rapidly crawled down, away from the light. With this process, about 12 ounces of earthworms could be separated from the bed for every 64 pounds of castings present.

The castings were collected and evaluated. Analysis indicated that the "dry" castings removed from the bed contained 57.4 percent moisture and 24.2 percent ash. The heat content of the organic compost was 1690 b.t.u./lb. The pH of the composted material, as evaluated with a Beckman pH meter, was 7.2.

EXAMPLE 2

In substantial accordance with the procedure of Example 1, a bed was constructed which was lined with plastic to retain moisture, and was sheltered from the rain in order to control the addition of moisture to the bed.

A sample of 48 cubic feet of RDF was saturated with water and placed in the bed. The material was covered with three inches of worm castings which contained only newly born (still white) worms and earthworm eggs, all of the adult earthworms having been removed by hand. The covering again successfully eliminated the odor from the bed.

After two month, the bed was permeated with small worms which were about ½ inch in length. The fibrous composition of the RDF made it impractical to attempt to harvest the worms or plastics at this stage.

The bed was maintained in a building in which the temperature was allowed to drop to 35 degrees Fahrenheit. The bed was turned with a pitchfork on a weekly basis.

After six months, an 84 pound batch of the material from the bed was sifted through a ½ inch screen. The material readily separated into two crude products. The organic compost material, which passed through the screen, weighed 64 pounds. The oversize material contained larger pieces of plastics, wood, and fibers; this oversize material is referred to as the "synthetic mix".

The worms were separated by hand from a representative sample of the material and were found to contain 12 ounces of worms per 64 pounds of compost, and about 3.5 ounces of worms per 20 pounds of untreated synthetic mix.

One sample of the organic compost was evaluated without being washed. One sample of organic material was washed once, one twice, and one three times. Thereafter, using Spurway test extract solutions, the pH, nitrate, phosphorus, potassium, calcium, and soluble salt content of the samples were determined. The results are presented below in Table 1.

TABLE 1

|  | Unwashed Sample | Once Washed Sample | Twice Washed Sample | Thrice Washed Sample |
|---|---|---|---|---|
| pH | 7.5 | 7.9 | 7.9 | 7.9 |
| Nitrate, ppm. | 69 | — | — | 5 |
| Phosphorus, ppm. | 5 | — | — | 8 |
| Potassium, ppm. | 60 | — | — | 35 |
| Calcium, ppm. | 100 | — | — | 75 |
| Soluble salts, ppm. | 155 | 110 | 80 | 55 |

It is believed that the fact that, after three washings, the sample retained 75 percent of its initial calcium content, indicates that the sample had good metal-complexing ability.

EXAMPLE 3

A worm bed was prepared by digging a pit 3 feet deep, 16 feet long, and 4 feet wide. Around the pit was placed a 2 foot high wooden side, making the depth of the bed a total of 5.0 feet.

Source separated household refuse, consisting of cardboard, plastics, paper, food refuse, leaves, lawn clippings, wood products, and tree trimmings, were shredded using a 5 horsepower garden variety shredder-chopper which generally produced 0.5 to 3.0 inch diameter material. The shredded material was soaked in a wheelbarrow and placed into the pit. The bed was filled to its top, a level two feet above ground level.

In substantial accordance with the procedure of Example 1, the bed was covered with 2.0 inches of castings. In addition, 50 pounds of mixed adult earthworms (see Example 1) were added.

The bed was kept moist using a sprinkling system which sprayed a fine mist onto the bed every morning for 15 minutes. No effort was made to prevent rain from falling onto the bed's surface.

After two weeks, a substantial amount of settling had occurred. More refuse was shredded, wetted, and added as described above and covered with castings. This process was then continued every two weeks for the next six months, at which time settling still occurred but did not appear to lower the bed below the ground level. Thereafter, no further refuse was added, and the material was permitted to compost.

The daily misting maintained the temperature of the bed at or below 90 degrees Fahrenheit. After an additional six months period, the only recognizable organic material was the undecomposed plastics and some larger pieces of wood. The material was then sifted through a ½ inch screen to yield 1.5 pounds of plastic and 15 pounds of worms per ton of castings.

A 16 ounce sample of bedding material was sifted through a ½ inch screen. All but about 1.5 ounces of the material passed through the screen, some of which was plastic material. Worms were removed from the compost material, and lumps present were crushed by hand to determine actual particle size. The material was again sifted using a 1/16 inch screen to give 1.7 ounces of fine wood chips and particles and 14 ounces of a fine-grained compost material.

The organic compost material passing through a ½ inch screen was saturated by placing it in a bin of water and thereafter by draining the material on a cotton cloth placed on a ½ inch screen. The material was weighed 24 hours after draining. Then a 2 pound sample of the material was placed in a 105 degree Fahrenheit oven. Every hour a portion of the sample was removed from the oven and weighted. When three successive readings indicated a change of less than 0.1 ounce, the sample was removed from the oven and weighed a final time. The sample weighed 3.8 ounces. Thus it had a moisture capacity, as defined this specification, of greater than 840 percent, and a moisture content of 88 weight percent.

The earthworms used in applicant's process are well known to those skilled in the art and are described in many publications cited elsewhere in this specification. Earthworms belong to the order Oligochaeta; they form 14 families and 1800 species. Thus, Lumbricids include *Lumbricus terrestris* (night crawlers), *Lumbricus rubellus* (redworm, red wigglers, hydrid red worm, English red, California red, etc.) Thus, other earthworms include *Allolobophora caligenosa* (field worms), Octolasium, Diplocardia Verrucosa (slime worms), *Allolobophora cholorotica* (green worms), Pheretime (swamp worms), and the like.

It is to be understood that the aforementioned description is illustrative only and that changes can be made in the apparatus, the ingredients and their proportions, and in the sequence of combinations and process steps as well as in other aspects of the invention herein without departing from the scope of the invention as defined in the following claims.

Thus, in one embodiment, the refuse material treated by the process contains from about 50 to about 85 weight percent of plastic material.

In another embodiment, the material treated by the process of this invention contains from about 1 to about 50 weight percent of sewer sludge and/or animal excrement.

In another embodiment, the material treated by the process of this invention contains from about 1 to about 50 weight percent of agricultural waste such as, e.g., cherry pits, apple pulp, corn husks, straw, and the like.

I claim:

1. A process for preparing an organic compost material with a water content of from about 45 to about 92 weight percent, a carbon content of from about 27 to about 85 weight percent (by weight of dry compost material), a pH of from about 6.2 to about 8.0, and a particle size distribution such that substantially zero percent of the particles in the compost material are greater than about 2.0 inches, from about 0.5 to about 35 weight percent of the particles in the compost material are greater than 1.0 inch, from about 0.5 to about 35 percent of the particles in the compost material are less than 1.0 inch but greater than 0.25 inches, and at least about 50 weight percent of the particles in the compost material are smaller than about 0.25 inches, comprising the steps of:

(a) providing a shredded refuse material, wherein:
1. said shredded material has a particle size such that substantially all of its particles are smaller than 5.0 inches;
2. said shredded material is comprised of from about 5 to about 96 weight percent of a cellulosic material selected from the group consisting of alpha-cellulose, beta-cellulose, gamma-cellulose, and mixture thereof; and
3. at least about 20 weight percent of said cellulosic material in said shredded material is wood cellulose with a degree of polymerization of less than about 900;

(b) adding a sufficient amount of water to said shredded refuse material to saturate it with water;

(c) providing an earthworm material which is a mixture of earthworm castings and a material selected from the group consisting of earthworms, earthworm eggs, and mixtures thereof;

(d) contacting said saturated shredded refuse material with said earthworm material to form a compostable mass of material which consist from about 20 to about 2,000 pounds of earthworm castings and from about 1 to about 100 pounds of earthworm material selected from the group consisting of earthworms, earthworm eggs, and mixtures thereof, for each ton of saturated, shredded refuse material in said compostable mass;

(e) for at least about the first thirty days after said compostable mass has been formed, maintaining the water content in said compostable mass at a concentration of at least about 80 percent by adding water to said compostable mass; and (f) subjecting said compostable mass to a temperature of from about 0 to about 54 degrees centigrade while maintaining the water content in said compostable mass at a concentration of from about 45 to about 92 weight percent for from about 4 to about 8 months.

2. The process as recited in claim 1, wherein said shredded refuse material is comprised of from about 4 to about 95 weight percent of a non-cellulosic material.

3. The process as recited in claim 1, wherein said organic compost material is screened.

4. The process as recited in claim 1, wherein said mixture is subjected to a temperature of from about 0 to about 54 degrees centigrade for from about 5 to about 7 months.

5. The process as recited in claim 1, wherein said earthworm material is a mixture of said earthworm castings, said earthworms and said earthworm eggs.

6. The process as recited in claim 5, wherein from about 40 to about 1,000 pounds of said earthworm castings are present for each ton of said shredded material in the mixture.

7. The process as recited in claim 5, wherein from about 2 to about 25 pounds of a mixture of earthworms and earthworm eggs are present for each ton of shredded material in the mixture.

8. The process as recited in claim 5, wherein from about 50 to about 500 pounds of said earthworm castings are present for each ton of shredded material in the mixture.

9. The process as recited in claim 1, wherein from about 2.5 to about 18 pounds of a mixture of earthworms and earthworm eggs are present for each ton of shredded material in the mixture.

10. The process as recited in claim 5, wherein said mixture is subject to a temperature of from about 0 to about 38 degrees centigrade for about six months.

11. The process as recited in claim 1, wherein said shredded refuse material is comprised of shredded paper.

12. The process as recited in claim 1, wherein said shredded refuse material is comprised of shredded cardboard.

13. The process as recited in claim 1, wherein said shredded refuse material is comprised of from about 5% to about 80% inorganic material.

14. The process as recited in claim 1, wherein said shredded refuse material has a particle size such that all of its particles are smaller than 2.0 inches.

15. The process as recited in claim 5, wherein said mixture of earthworm material and shredded refuse material is in an open bed while it is being subjected to a temperature of from about 0 to about 38 degrees centigrade.

16. The process as recited in claim 5, wherein said mixture of earthworm material and shredded refuse material is in a closed bed while it is being subjected to a temperature of from about 0 to about 38 degrees centigrade.

17. The process as recited in claim 1, wherein said shredded refuse material is comprised of food waste.

18. The process as recited in claim 1, wherein said shredded refuse material is comprised of yard waste.

19. A process for preparing an organic compost material, comprising the steps of:

(a) providing a refuse material with a moisture content of from about 5 to about 40 weight percent, wherein:
1. said refuse material has a particle size such that substantially all of its particles are smaller than 2.0 inches;
2. said refuse material is comprised of from about 1 to about 50 weight percent of a cellulosic material selected from the group consisting of alpha-cellulose, beta-cellulose, gamma-cellulose, and mixture thereof;

(b) adding a sufficient amount of water to said refuse material to saturate it;

(c) providing an earthworm material which is a mixture of earthworm castings and a material selected from the group consisting of earthworms, earthworm eggs, and mixtures thereof;

(d) contacting said saturated refuse material with said earthworm material to form a compostable mass of material which consist from about 20 to about 2,000 pounds of earthworm castings and from about 1 to about 100 pounds of earthworm material selected from the group consisting of earthworms, earthworm eggs, and mixtures thereof, for each ton of saturated, shredded refuse material in said compostable mass;

(e) for at least about the first thirty days after said compostable mass has been formed, maintaining the water content in said compostable mass at a concentration of at least about 80 percent by adding water to said compostable mass; and (f) subjecting said compostable mass to a temperature of from about 0 to about 54 degrees centigrade while maintaining the water content in said compostable mass at a concentration of from about 45 to about 92 weight percent for from about 3 to about 6 months.

* * * * *